G. Hall,
Sawing Shingles,
N°18,967. Patented Dec. 29, 1857.

UNITED STATES PATENT OFFICE.

GEORGE HALL, OF MORGANTOWN, VIRGINIA.

MACHINE FOR SAWING SHINGLES.

Specification of Letters Patent No. 18,967, dated December 29, 1857.

*To all whom it may concern:*

Be it known that I, GEORGE HALL, of Morgantown, in the county of Monongalia and State of Virginia, have invented certain new and useful Improvements in Shingle-Machines; and I do hereby declare the following to be a full, clear, and exact description of the construction and operation of the same, reference being had to the accompanying drawings, making a part of this specification, in which—

Figure 2:
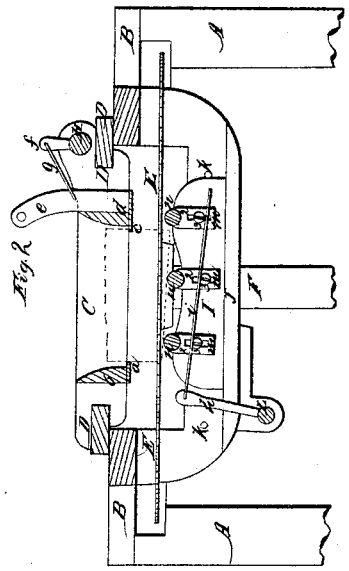
Figure 3:
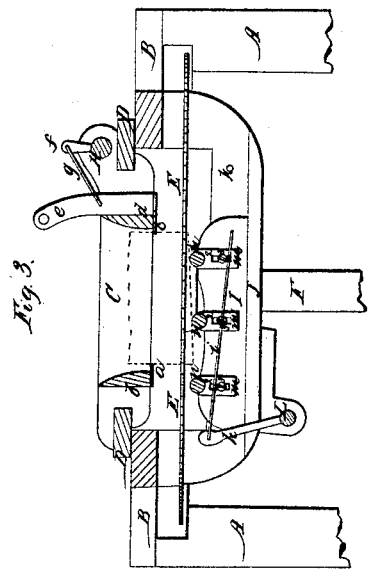
Figure 1:
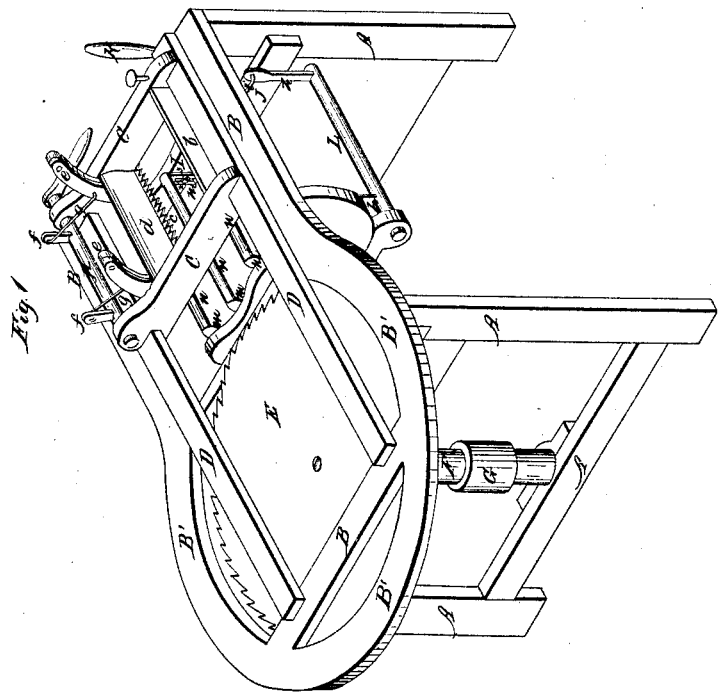

Figure 1, represents a perspective view. Fig. 2, represents a transverse section through the carriage and bed, showing the bolt or block in red lines, and its inclination, to form the taper of the shingle; and Fig. 3, represents a similar section, with the bed slid the other way to reverse the inclination of the bolt, so as to cut the shingles therefrom point and butt.

Similar letters of reference where they occur in the separate figures, denote like parts of the machine in all of them.

The nature of my invention relates to the arrangement of the ribs, in a horizontally reciprocating carriage so that the bolt, from which the shingle is to be cut, when dropped alternately on the outer and center rib, shall have the proper inclination for the taper of the shingle, and shall reverse the ends from which the alternate butt and point is taken.

To enable others skilled in the art to make and use my invention, I will proceed to describe the same with reference to the drawings.

A, represents a frame, which supports a table B, on which the carriage C, may move, on suitable ways D D.

E, is a circular saw, arranged on the top of a vertical shaft F, which is supported in said frame, and is revolved by a belt passing from any first mover around its pulley G. The saw runs just underneath the circular part B′ of the table.

The carriage C, has a fixed dog $a$ on one of its head blocks $b$, and a movable dog $c$, hinged to it, and swinging underneath its opposite head block $d$,—said movable dog, being connected to the lever rock shaft H, by arms $e$, $f$, and connecting rods $g$, so that the operator can readily release the bolt or block from which the shingles are to be cut, and allow it to drop clear of the carriage, and again dog it fast to said carriage.

A carriage I, of peculiar construction, underneath that end of the table at which the operator stands, and which is the opposite end from the saw E, moves horizontally on ways J, J, attached to the table and frame, said movement being effected by a lever K, which is connected to one end of a rock shaft L. On this rock-shaft L, are two arms $h$, $h$, from which connecting rods $i$, $i$, extend, and are fastened to the carriage I, so that the moving of the lever K, will cause the carriage to traverse its ways J, suitable stops $k$, being provided at the proper distances, to regulate the extent of traverse it is to have, and said stops may be adjustable so as to provide for longer or shorter bolts of wood.

To each of the side rails of the carriage I, are connected the turned down ends $m$ $m$ $m$, of the ribs $n$, $n$, $n$, which extend from rail to rail of the carriage. These ends $m$, have vertical slots 2, cut in them, through which set screws 3, pass, and by which they can be adjusted at such respective heights, as the taper, and thickness of the shingle, desired to be cut may demand. The two outer ribs, when properly adjusted, stand higher than the center one, and when the carriage I, is in the position shown in Fig. 2, the block or bolt, will rest upon the two ribs to the left (the bolt being represented in red lines), making the point of the shingle at the left end of the bolt. But when the carriage is in the position shown in Fig. 3, the bolt (in red lines) will rest on the two right hand ribs, and the point of the shingle be formed at the right hand end of the bolt. By adjusting these ribs any desirable thickness of point and butt, and of taper may be given to the shingle. Every time that the carriage C, takes the bolt past the saw, a shingle is cut—the carriage is then drawn back. The operator by the lever K shifts the carriage I, the bolt is released, and drops upon the ribs $n$, $n$, for the time being underneath it, and then it is caught again by the dogs, and again passed over the saw and thus reversing the ends from which the point of the shingle is cut alternately. I am aware that a rocking bed, has been used for this purpose, but my horizontally moving carriage, does not rock in any manner.

Having thus fully described the nature and object of my invention, what I claim therein as new and desire to secure by Letters Patent is—

In combination with the horizontally reciprocating carriage C, for carrying the bolt to the saw, the transverse carriage I, also moving on horizontal ways, but provided with ribs $n$, $n$, $n$, so arranged as that the block or bolt dropping upon them shall be held in the proper position for alternately changing the point and butt of the shingle and for giving the shingle the proper thickness and taper as herein set forth.

GEORGE HALL.

Witnesses:
A. B. STOUGHTON,
THOS. H. UPPERMAN.